US012682175B2

(12) United States Patent
Oh

(10) Patent No.: US 12,682,175 B2
(45) Date of Patent: Jul. 14, 2026

(54) DOCUMENT ANALYSIS SYSTEM USING ARTIFICIAL INTELLIGENCE TO IDENTIFY THE EMOTIONAL STATE AND KEYWORDS OF THE DOCUMENT WRITER AND DETERMINE RELATIONSHIPS AMONG GROUP MEMBERS

(71) Applicant: Tebahsoft Inc., Yuseong-gu (KR)

(72) Inventor: Jung Sup Oh, Daejeon (KR)

(73) Assignee: Tebahsoft Inc., Yuseong-gu (KR)

( * ) Notice: Subject to any disclaimer, the term of this patent is extended or adjusted under 35 U.S.C. 154(b) by 0 days.

(21) Appl. No.: 19/303,880

(22) Filed: Aug. 19, 2025

(65) Prior Publication Data

US 2026/0030453 A1 Jan. 29, 2026

Related U.S. Application Data

(63) Continuation-in-part of application No. 19/075,976, filed on Mar. 11, 2025, now abandoned.

(30) Foreign Application Priority Data

Jul. 25, 2024 (KR) ........................ 10-2024-0098491

(51) Int. Cl.
*G06F 17/00* (2019.01)
*G06F 40/284* (2020.01)
*G06F 40/30* (2020.01)

(52) U.S. Cl.
CPC ............ *G06F 40/30* (2020.01); *G06F 40/284* (2020.01)

(58) Field of Classification Search
None
See application file for complete search history.

(56) References Cited

U.S. PATENT DOCUMENTS 10,825,449 B1 11/2020 Chinnalagu
11,153,250 B2 10/2021 Pavitt et al.
11,188,718 B2 * 11/2021 Breedvelt-Schouten ...................
G06F 40/35
11,190,467 B2 * 11/2021 Dunne .................... H04L 51/04
(Continued)

FOREIGN PATENT DOCUMENTS

CA 3116122 A1 * 10/2021 ......... H04L 65/4053
CA 2967976 C * 8/2022 ............. G10L 25/63
(Continued)

OTHER PUBLICATIONS

Kim, Deokjin; "Social Network Analysis Understanding;" Korea Insight Research Institute; powerpoint; pp. 1-48.
(Continued)

*Primary Examiner* — Satwant K Singh
(74) *Attorney, Agent, or Firm* — Studebaker Brackett PLLC

(57) ABSTRACT

The present invention relates to a document analysis system that utilizes artificial intelligence to analyze documents written by group members in their daily lives, extract the key emotions and key keywords of the document writer, and determine relationships among group members. By utilizing the extracted key emotions and key keywords, the system analyzes and intuitively presents whether certain members are connected as a group or close companions, or whether certain members are isolated and not interacting with others.

8 Claims, 7 Drawing Sheets

(56) References Cited

U.S. PATENT DOCUMENTS

| | | | | |
|---|---|---|---|---|
| 11,645,319 B1 * | 5/2023 | Krusell | .................. | G06F 16/35 |
| | | | | 707/748 |
| 2017/0371496 A1 | 12/2017 | Denoue et al. | | |
| 2021/0076002 A1 | 3/2021 | Peters et al. | | |
| 2021/0390553 A1 | 12/2021 | Brinig et al. | | |
| 2023/0237417 A1 * | 7/2023 | Kumar | ............ | G06Q 10/06398 |
| | | | | 705/7.42 |
| 2024/0070398 A1 * | 2/2024 | Nakayama | ............ | G06F 40/268 |
| 2024/0374202 A1 * | 11/2024 | Krishnaprasad | ..... | A61B 5/0077 |
| 2024/0403563 A1 * | 12/2024 | Bex, IV | ................ | G06F 16/383 |

FOREIGN PATENT DOCUMENTS

| | | | | | |
|---|---|---|---|---|---|
| CA | 3080614 C | * | 12/2023 | ........... | G06F 16/367 |
| KR | 10-2023-0030693 A | | 3/2023 | | |
| KR | 10-2023-0067888 A | | 5/2023 | | |
| KR | 102544313 B1 | | 6/2023 | | |
| KR | 10-2642589 B1 | | 2/2024 | | |
| KR | 10-2024-0050710 A | | 4/2024 | | |

OTHER PUBLICATIONS

"Request for the Submission of an Opinion" Office Action issued in KR 10-2024-0098491; mailed by the Korean Intellectual Property Office on Oct. 15, 2024.
"Written Decision on Registration" Office Action issued in KR 10-2024-0098491; mailed by the Korean Intellectual Property Office on Dec. 23, 2024.

* cited by examiner

FIG. 6

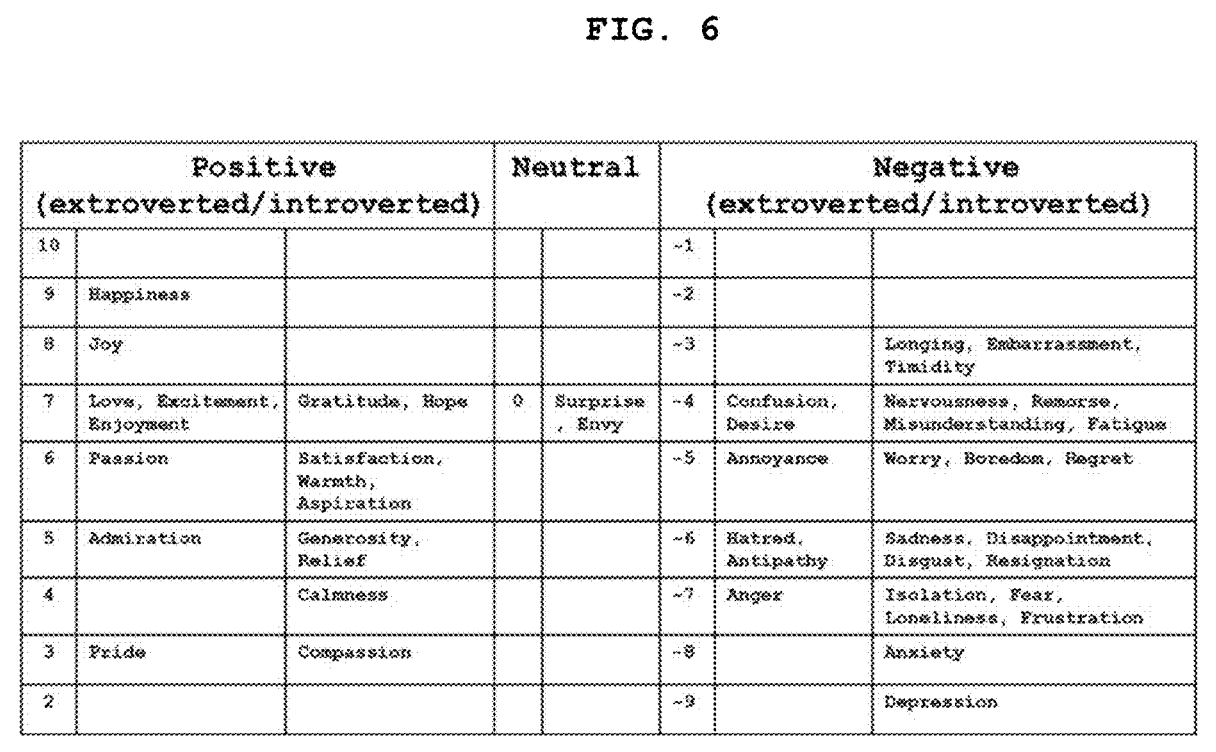

| Positive (extroverted/introverted) | | Neutral | | Negative (extroverted/introverted) | |
|---|---|---|---|---|---|
| 10 | | | -1 | | |
| 9 Happiness | | | -2 | | |
| 8 Joy | | | -3 | | Longing, Embarrassment, Timidity |
| 7 Love, Excitement, Enjoyment | Gratitude, Hope | 0 Surprise, Envy | -4 | Confusion, Desire | Nervousness, Remorse, Misunderstanding, Fatigue |
| 6 Passion | Satisfaction, Warmth, Aspiration | | -5 | Annoyance | Worry, Boredom, Regret |
| 5 Admiration | Generosity, Relief | | -6 | Hatred, Antipathy | Sadness, Disappointment, Disgust, Resignation |
| 4 | Calmness | | -7 | Anger | Isolation, Fear, Loneliness, Frustration |
| 3 Pride | Compassion | | -8 | | Anxiety |
| 2 | | | -9 | | Depression |

DOCUMENT ANALYSIS SYSTEM USING ARTIFICIAL INTELLIGENCE TO IDENTIFY THE EMOTIONAL STATE AND KEYWORDS OF THE DOCUMENT WRITER AND DETERMINE RELATIONSHIPS AMONG GROUP MEMBERS

CROSS-REFERENCE TO RELATED APPLICATIONS

This application is a continuation-in-part application of U.S. patent application Ser. No. 19/075,976, filed on Mar. 11, 2025, which claims the priority of Korean Patent Application No. 10-2024-0098491 filed on Jul. 25, 2024, in the Korean Intellectual Property Office, the disclosures of which are incorporated herein by reference.

BACKGROUND OF THE INVENTION

Field of the Invention

The present invention relates to a document analysis system that utilizes artificial intelligence to analyze documents and identify relationships among group members. More specifically, the invention analyzes documents written by group members to detect emotions and events, and based on this analysis, determines how group members are connected and identifies isolated members. The system utilizes artificial intelligence to extract the emotional state and keywords of the document writer while also assessing the relationships among group members.

Description of the Related Art

Modern individuals face severe psychological difficulties due to various factors, including social pressure, economic instability, rapid technological changes, and interpersonal relationships among group members. Issues such as anxiety, depression, and stress are becoming increasingly prevalent.

Anxiety and depression are among the most common mental health issues today, affecting millions of people worldwide. As awareness of mental health increases, the need for accurate diagnosis and monitoring of mental health conditions has also grown.

Various factors, including the influence of social media, economic pressures, work-life imbalance, and interpersonal relationships among students and employees, play a critical role in exacerbating mental health issues. Understanding these factors is essential for diagnosing and treating mental health conditions effectively.

Accurate diagnosis and understanding of an individual's psychological state are crucial for effective treatment and management of mental health problems. Through proper diagnosis, personalized treatment plans s tailored to each individual's unique needs can be established, ensuring more effective and targeted treatment.

For students, identifying and addressing psychological conditions is vital for their overall well-being and academic success. Mental health is essential for emotional, physical, and psychological well-being, and addressing mental health issues can significantly impact learning, engagement, and academic performance.

For employees, mental health has a significant impact on productivity, job satisfaction, and the overall workplace environment. Implementing mental health programs in the workplace can help identify and treat issues at an early stage, reducing absenteeism, improving productivity, and fostering a healthier work environment.

Understanding the psychological state of group members, including students and employees, and detecting problems early for timely intervention is essential for individual well-being, academic success, and workplace productivity.

Various methods exist for assessing the psychological state of group members. Among them, prior patents related to analyzing documents written by group members to understand their mental state and those related to determining relationships among members include the following:

Korean Patent Application No. 10-2024-0050710 ("Method, Computer Device, and Computer Program for Providing a Conversation-Based Emotion Diary") records user emotions in an emotion diary through a virtual character's conversation scenarios. By automatically capturing the emotions expressed in the conversation, it generates reports on emotional changes and distributions over a given period, enabling users to conveniently monitor their emotional state.

Korean Registered Patent No. 10-2642589 ("Personalized Content Recommendation System Through Diary Analysis") analyzes daily records such as text and voice data voluntarily written by users using machine learning. It identifies user emotions and situations and recommends personalized content accordingly, improving user satisfaction and ensuring the delivery of real-time content aligned with their emotions and interests.

Korean Patent Application No. 10-2023-0030693 ("Mind Management Maintenance System") enhances the accuracy of mental health assessments by analyzing self-recorded data, such as diary entries. It categorizes users based on their psychological profiles, visualizes their diagnosis results, and provides personalized content tailored to their characteristics.

Korean Patent Application No. 10-2023-0067888 ("Friendship Diagnosis Server and Method Using the Same") involves sending selected psychological diagnostic questions to student terminals, responses, generating a receiving friendship relationship map among students based on psychological test results, analyzing the map to calculate risk indices for each student, and generating a teacher's psychological diagnostic report that includes the calculated risk indices.

While various services have been developed to analyze individual emotions, generate relationship maps, and calculate risk indices, most focus on individual emotional analysis and personalized services. Additionally, current approaches often rely on explicit psychological diagnostic tests, which require sending structured questions to members. However, this method has limitations in naturally assessing interpersonal relationships based on members' day-to-day interactions.

SUMMARY OF THE INVENTION

The present invention has been devised to improve the aforementioned issues by providing a document analysis system that utilizes artificial intelligence to analyze documents written by group members in their daily lives. The system extracts the key emotions and keywords of the document writer and, based on the extracted emotions and keywords, determines which members are closely associated as a group or as close companions, and which members are isolated and unable to interact with others. By intuitively presenting this information, the system enables the analysis of documents using artificial intelligence to identify the emotional state and keywords of the document writer and to determine the relationships among group members.

Unlike conventional psychological surveys or diagnostic tests, the present invention analyzes naturally recorded documents, such as shared diaries written by group members. This approach enables a more factual and comprehensive analysis of members' emotions and daily events. Based on this analysis, the system effectively determines whether a group member is happy, depressed, or how they interact with other members of the group. By utilizing artificial intelligence to analyze documents, the system identifies the emotional state and keywords of the document writer and determines the relationships among group members.

To achieve the aforementioned objectives, the document analysis system according to the present invention, which analyzes documents using artificial intelligence to identify the emotional state and keywords of the document writer and determine the relationships among group members, comprises:

An emotion extraction unit, which analyzes the context of documents written by and extracts group members a predetermined number of key emotions of the document writer, A keyword extraction unit, which analyzes the context of the document and extracts a predetermined number of key keywords and A member relationship analysis unit, which utilizes the extracted key emotions and keywords to determine the relationships among group members, analyzing their connections and identifying isolated members.

The emotion extraction unit comprises:

An AI emotion extraction module, which analyzes multiple emotions listed in the emotion list using artificial intelligence and extracts the key emotions of the document writer that appear in the document context from the predefined emotion list and An emotion scoring module, which comprehensively calculates the document writer's overall emotion score based on the emotion scores assigned to each emotion extracted by the AI emotion extraction module.

Specifically, the emotion scoring module:

Categorizes each emotion extracted by the AI emotion extraction module into positive, neutral, or negative and Calculates the document writer's emotion score based on an emotion classification score table, which assigns numerical scores to each categorized emotion.

The member relationship analysis unit:

(1) Determines keyword similarity by analyzing whether the key keywords among group members' documents on the same date are similar and (2) Determines emotional similarity by checking whether at least one of the extracted emotions matches among the group members' documents on the same date and whether the difference in their overall emotion s remains below a predefined threshold.

If both conditions (1) keyword similarity and (2) emotional similarity are satisfied, the system determines that the corresponding members are associated with each other.

Specifically, the member relationship analysis unit:

Determines that members are closely associated as a group or close companions if the number of days they satisfy both (1) keyword similarity and (2) emotional similarity exceeds a predefined threshold over a recent period and Determines that a member is isolated if they do not form associations with other members and the frequency of negative emotions exceeds a predefined threshold over a recent period.

The member relationship analysis unit is specifically structured as follows.

The member relationship analysis unit comprises:

An event-sharing determination module, which evaluates the similarity between multiple keywords extracted from documents written by group members on the same date. If the similarity exceeds a predefined threshold, the system determines that the members share an event.

An emotion-sharing determination module, which analyzes emotions extracted by the AI emotion extraction module from documents written by group members on the same date. If at least one extracted emotion matches and the difference in the overall emotion scores calculated by the emotion scoring module remains below a predefined threshold, the system determines that the members share emotions.

A member relationship determination module, which classifies relationships based on the results of the event-sharing and emotion-sharing determination modules as follows:

If three or more members share both events and emotions above a predefined threshold over a recent period, they are classified as a group.

If two members share both events and emotions above a predefined threshold over a recent period, they are classified as close companions.

If a member does not belong to a group or close companionship and exhibits negative emotions above a predefined threshold over a period, they are classified as isolated.

The member relationship analysis unit further comprises:

An anomaly detection module, configured to analyze the daily overall emotion scores of members over a recent period. If the number of days in which a member's emotion score deviates beyond a predefined threshold from the mean or median exceeds a certain count, the system classifies the member as having anomalies.

The member relationship determination module, configured to classify a member as a high-risk member if:

The member does not belong to a group or close companionship,

The member's negative emotions exceed a predefined threshold over a recent period and The anomaly detection module has classified the member as having anomalies.

The member relationship analysis unit further comprises:

A support message output module, which utilizes artificial intelligence to analyze:

Each member's connection status or isolation status among the group members, as determined by the member relationship determination module.

The keywords and emotions that served as the basis for determining their connection or isolation status.

Based on this analysis, the module generates personalized support messages reflecting the member's connection status, keywords, and emotions, and provides these messages to each member.

Meanwhile, the member relationship analysis unit may further comprise:

A centrality display module, which:

Analyzes the similarity between multiple keywords extracted by the keyword extraction unit from documents written by members on the same date. If the similarity exceeds a predefined threshold, the system connects the members with a relationship line.

Evaluates the emotions extracted from the documents of members connected by a relationship line on the same date. If at least one of the extracted emotions matches and the difference in their overall emotion scores remains below a predefined threshold, the system displays the relationship line as being connected with a positive or negative emotion.

If no emotions match and the difference in overall emotion scores exceeds a predefined threshold, the system displays the relationship line as being connected with an unrelated emotion.

The centrality display module allows multiple relationship lines to be displayed between members by adding relationship lines for each document, enabling the representation of multiple connections between members.

The member relationship analysis unit may further comprise:

An individual centrality calculation module, which computes the centrality of each member by aggregating the number and types of relationship lines connected to them and calculating their individual centrality score.

The member relationship analysis unit may further comprise:

A lifestyle classification module, which:

Determines a member as an insider if their centrality score exceeds a predefined threshold.

Determines a member as an outsider if their centrality score falls below a predefined threshold.

Identifies a member as a high-risk member if they have a high number of relationship lines connected through negative emotions.

The member relationship analysis unit may further comprise:

A centrality change monitoring module, which:

Observes daily fluctuations in a member's centrality score to determine whether it is increasing or decreasing.

If the centrality score is decreasing, the system assesses that the member is becoming isolated.

Notifies the affected member and their administrator about the situation to prompt appropriate intervention.

According to the present invention, instead of using direct psychological surveys, the system analyzes daily documents commonly written by group members to extract emotions and keywords. This approach allows for an accurate analysis of each member's emotions on a given day and enables precise identification of events that occurred on that day based on the document's keywords.

By utilizing the analyzed emotions and events, the system makes it easier to determine how members are connected to each other and to identify members who are isolated within the group.

Workplace managers or school teachers responsible for overseeing members can use the analysis report to understand how members are interconnected and monitor each member's daily emotional changes to assess their mental health.

Additionally, the system allows for the immediate identification of members who are struggling to interact with the group and are in a potentially high-risk state. By providing targeted attention and support to these individuals, their mental well-being can be improved.

BRIEF DESCRIPTION OF THE DRAWINGS

FIG. 6 is an example of an emotion classification score table illustrating emotion scores assigned to each emotion item included in the emotion list, according to an embodiment of the present invention.

DETAILED DESCRIPTION OF THE INVENTION

Figure 1:
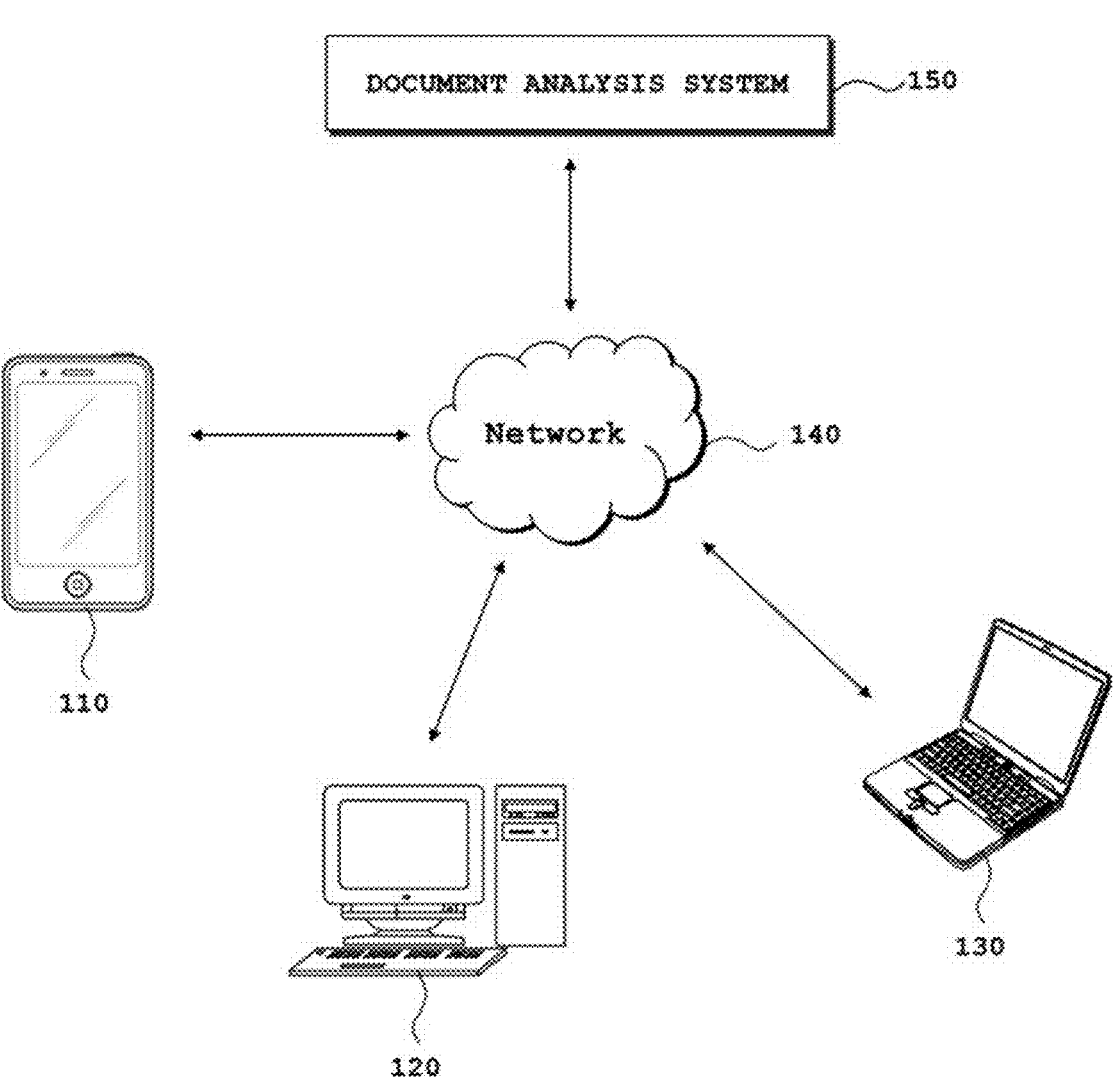
FIG. 1 is a diagram illustrating an example of a network environment according to an embodiment of the present invention.

The advantages and features of the present invention, as well as the methods for achieving them, will become clearer with reference to the embodiments described in detail below, along with the accompanying drawings.

However, the present invention is not limited to the embodiments disclosed herein and may be implemented in various different forms.

The embodiments described in this specification are provided to ensure a complete disclosure of the invention and to fully convey the scope of the invention to those skilled in the relevant technical field.

Furthermore, the present invention is defined solely by the scope of the claims.

Accordingly, in some embodiments, well-known components, operations, and techniques are not specifically described to prevent ambiguity in the interpretation of the invention.

Additionally, throughout the specification, the same reference numerals refer to the same components, and the terms used herein are for explanatory purposes only and are not intended to limit the invention.

Unless explicitly stated otherwise, the singular form in this specification also includes the plural form. Furthermore, the terms "includes" or "comprises", when referring to components and operations, do not exclude the presence or addition of one or more other components or operations.

Unless otherwise defined, all terms used in this specification (including technical and scientific terms) are to be interpreted in accordance with their commonly understood meanings by those skilled in the relevant technical field to which the present invention pertains.

Additionally, terms that are generally used and defined in dictionaries are not to be interpreted in an idealized or excessively broad manner unless explicitly defined otherwise. Hereinafter, preferred embodiments of the present invention will be described with reference to the accompanying drawings.

FIG. 1 is a conceptual diagram illustrating a configuration in which a document analysis system (150) analyzes documents using artificial intelligence (AI) to identify the emotional state and key keywords of a document author and to determine relational connections among group members. The document analysis system (150) is communicatively connected to a plurality of group member terminals (110, 120, 130).

The plurality of group member terminals (110, 120, 130) may include user terminals used by individuals who submit documents to be analyzed and receive the analysis results from the document analysis system (150). In some embodiments, the group member terminals may also include administrator terminals that are used by supervisors or managers to receive and review the analysis results.

The plurality of group member terminals (110, 120, 130) are configured to communicate with the document analysis system (150) via a network (140). The network (140) may include any of a wired network such as Ethernet, a power line communication (PLC)-based home network, telephone line communication, or RS-serial communication; a wireless network such as a mobile communication network, wireless local area network (WLAN), Wi-Fi, Bluetooth, or ZigBee; or a combination of two or more of the foregoing. The communication protocol or method employed for such connectivity is not limited to any particular standard.

Although, in FIG. 1, the group member terminals are illustrated as a mobile terminal (110), a personal computer (PC) terminal (120), and a laptop terminal (130), this is merely exemplary and not intended to be limiting. The group member terminals (110, 120, 130) may be any type of computing device capable of wired and/or wireless communication and capable of executing an application or web browser. Furthermore, while FIG. 1 depicts three group member terminals communicating with the document analysis system (150) via the network (140), the present disclosure is not limited thereto. Any number of group member terminals may be configured to communicate with the document analysis system (150) over the network (140).

Figure 2:
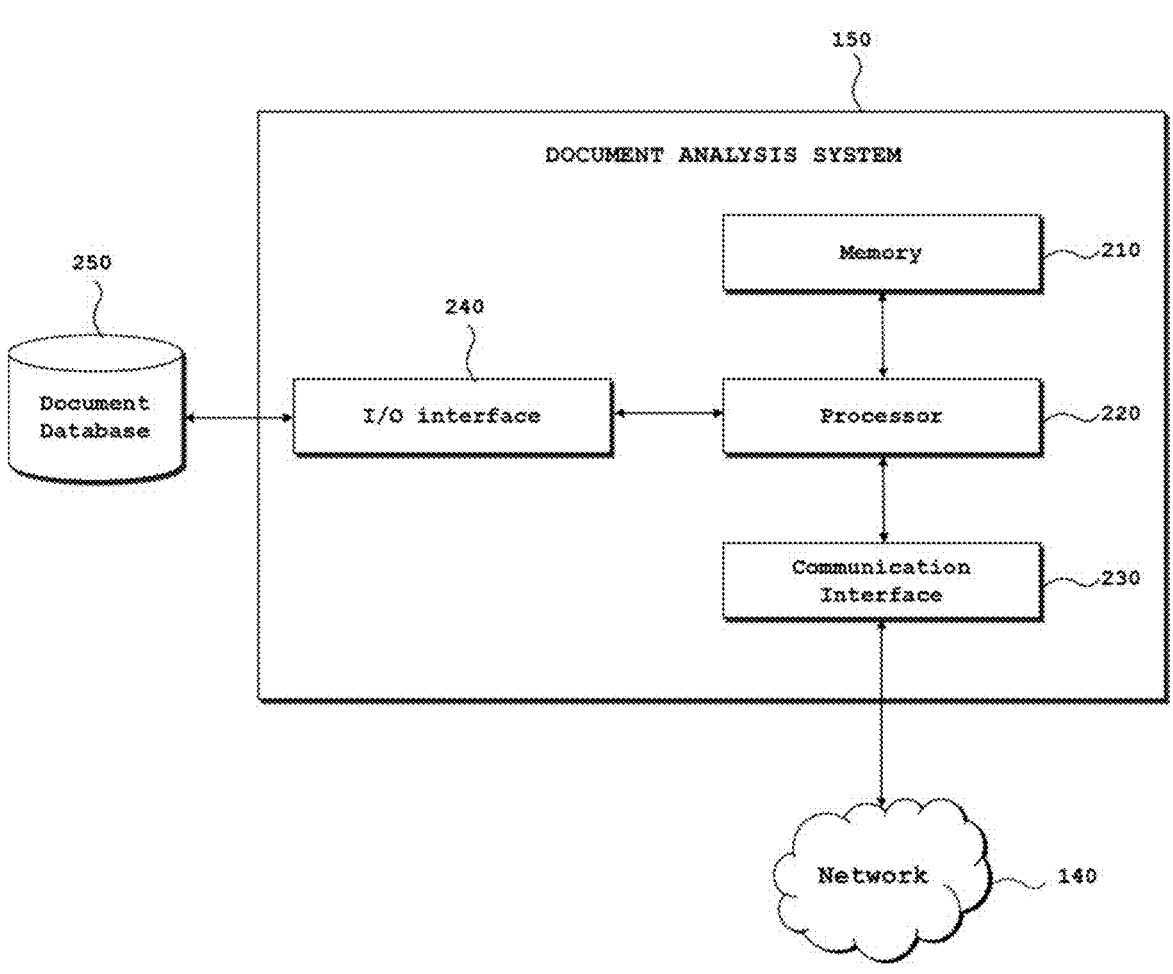
FIG. 2 is a block diagram illustrating the internal configuration of a document analysis system according to an embodiment of the present invention.

FIG. 2 is a block diagram illustrating an internal configuration of a document analysis system (150) according to an embodiment of the present invention.

The document analysis system (150) may include a memory (210), a processor (220), a communication interface (230), and an input/output interface (240). As illustrated in FIG. 2, the document analysis system (150) may be configured to communicate information and/or data via the network (140) using the communication interface (230). Additionally, the document analysis system (150) may output the results of the analysis, based on information input from the group member terminals (110, 120, 130), through the input/output interface (240). A manager or administrator may review the output results. Alternatively, the document analysis results may be transmitted to the administrator's terminal via the network (140).

The memory (210) may include any non-transitory computer-readable recording medium. In one embodiment, the memory (210) may comprise a permanent mass storage device such as read-only (ROM), a disk drive, a solid-state drive (SSD), or memory flash memory. In another embodiment, the permanent mass storage device, such as a ROM, SSD, flash memory, or disk drive, may be provided as a separate persistent storage unit distinct from the memory, and included in the document analysis system (150). A document database (250) may also be stored in such a permanent mass storage device, for example, a disk drive. Additionally, the memory (210) may store an operating system and at least one program code (e.g., application code executed on the group member terminals and/or the administrator terminal).

Such software components may be loaded into the memory (210) from a computer-readable recording medium that is separate from the memory (210). For example, the computer-readable recording medium may include a floppy drive, disk, tape, DVD/CD-ROM drive, or memory card. In another example, the software components may be loaded into the memory (210) not from a recording medium, but via the communication interface (230), such as through a wired or wireless network.

The processor (220) may be configured to execute instructions of a computer program by performing basic arithmetic operations, logical operations, and input/output operations. The instructions may be provided to the processor (220) by the memory (210) or via the communication interface (230). For example, the processor (220) may be configured to execute the received instructions in accordance with program code stored in a storage device such as the memory (210).

The communication interface (230) is configured to provide a function or configuration that enables the document analysis system (150) to communicate with terminals (110, 120, 130) of group members and administrators via the network (140). For example, the communication interface (230) may receive documents uploaded from group member terminals, transmit the documents to the processor (220) for analysis, and deliver the analysis results to the administrator's terminal.

The input/output interface (240) may be configured to interface with input and output devices. For example, the input device may include devices such as a microphone, keyboard, or mouse, and the output device may include a display or speaker. The input/output interface (240) may further be configured to interface with a document database (250). The document database (250) may store documents authored and uploaded by group members via devices such as personal computers or smartphones. The document analysis system (150) may analyze the documents stored in the document database (250) and transmit the resulting analysis data to terminals of group members and administrators via the network (140).

Figure 3:
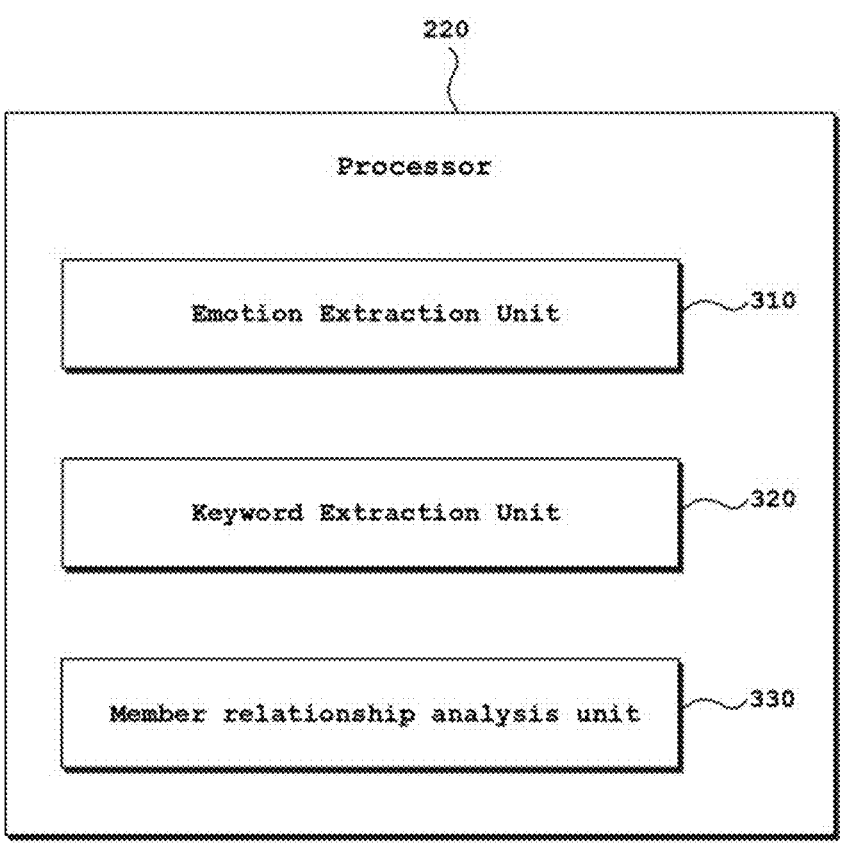
FIG. 3 is a block diagram illustrating the internal configuration of a processor according to an embodiment of the present invention.

FIG. 3 is a block diagram illustrating an internal configuration of the processor (220) according to an embodiment of the present invention. According to one embodiment, at least one processor (220) of the document analysis system (150) may include an emotion extraction unit (310), a keyword extraction unit (320), and a member relationship analysis unit (330). In addition, documents authored and uploaded by group members through devices such as personal computers or smartphones may be stored in a document database (250), which is connected to the input/output interface (240).

The document analysis system (150) is configured to automatically analyze the emotional states and interpersonal relationships of individual group members based on routine documents that are commonly authored by members of a group who usually associate and interact together.

The system includes a processor (220) capable of receiving document data from member terminals (110, 120, 130) via the communication interface (230), and executing an artificial intelligence-based emotion analysis algorithm loaded from the memory (210). The processor (220) comprises the following primary functional modules:

1. Emotion Extraction Unit (310)

The emotion extraction unit (310) receives the semantic context of documents routinely written by group members as input. This context undergoes natural language preprocessing and sentence vectorization to be transformed into a suitable format for emotion analysis.

Subsequently, the processor (220) loads and executes an artificial intelligence-based emotion classification algorithm stored in the memory (210) (e.g., a BERT-based classifier or an LSTM-based classifier) to extract the author's emotional state through the following procedure:

After embedding the context, a predetermined number of primary emotions are selected from among a predefined set of emotion categories (e.g., happiness, anger, anxiety, fatigue, depression, motivation) based the highest probability scores.

The classification result includes a probability or score for each emotion, which serves as the basis for computing the overall emotional score in subsequent modules.

2. Keyword Extraction Unit (320)

The keyword extraction unit (320) receives the semantic context of the document as input and processes it using a morpheme analyzer (e.g., mecab-ko, Khaiii, KoNLPy) to decompose the text into morphemes, following these steps:

Meaningful morphemes such as nouns, verbs, and adjectives are extracted, and stopwords are removed.

Subsequently, algorithms such as TF-IDF or TextRank are applied to automatically select a predefined number of key keywords.

The extracted keywords are vectorized and used in computing keyword similarity between group members.

3. Member Relationship Analysis Unit (330)

The member relationship analysis unit (330) receives, as input, a plurality of major emotions and emotion scores derived from the emotion extraction unit (310), as well as the main keywords extracted by the keyword extraction unit (320), and performs the following decision-making processes:

(a) Event Sharing Determination:

The system compares the similarity between the main keywords extracted from documents authored by each group member over a recent period (e.g., 7 days, 30 days).

The similarity is quantified using methods such as cosine similarity or Jaccard similarity. If the computed value exceeds a keyword similarity threshold stored in the comparison reference table, it is determined that the corresponding members have shared a common event.

The keyword comparison may be performed based on n-gram units or Named Entity Recognition (NER) techniques.

(b) Emotion Sharing Determination:

During the same recent period, the system first determines whether at least one of the multiple emotions expressed by each group member belongs to the same emotion category.

If the difference between the overall emotional scores of the members (e.g., weighted average scores per emotion) is less than or equal to an emotional score threshold stored in the comparison reference table, it is determined that the members share emotions.

The difference in emotional scores may be calculated using Euclidean distance or absolute value difference.

(c) Association Determination:

If both conditions—(a) event sharing and (b) emotion sharing—are satisfied, the system determines that the corresponding group members are associated with one another.

These associations are represented in a connected graph structure or used as input for centrality calculation.

Conversely, members who do not meet the conditions are classified as isolated or disconnected nodes.

4. Role of the Reference Threshold Table:

The reference threshold table is stored in the memory (210) and contains various threshold values-such as the keyword similarity threshold, emotion score threshold, and isolation determination threshold. These values can be updated when necessary via the administrator terminal (130).

The thresholds serve as key parameters that define the system's decision criteria. They are initially configured through experimental or statistical methods and may be dynamically adjusted or refined over time through learning or calibration processes.

As described above, the present system provides a technical framework for analyzing and visualizing emotional connectedness and isolation among group members by quantitatively extracting key emotions and keywords from everyday documents authored by the group members using morphological analysis and AI-based emotion inference algorithms, and by comprehensively comparing the results based on multi-level criteria defined in a reference threshold table.

Such analysis is particularly useful for the early detection of emotional risks or for monitoring the psychological states of individuals in groups such as student communities, organizational teams, or collaborative project groups, thereby supporting emotional care or behavioral interventions.

Figure 4:
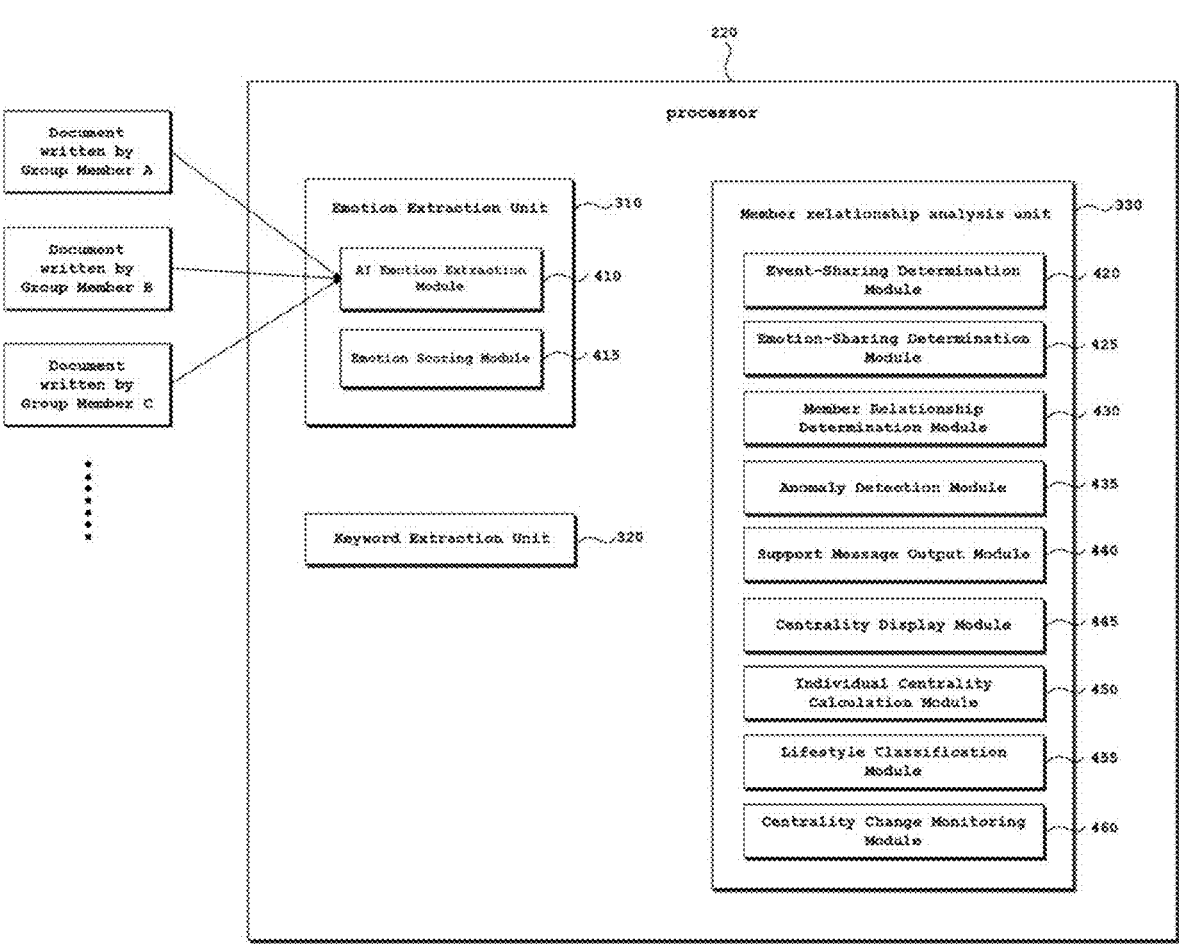
FIG. 4 is a block diagram illustrating detailed configurations of individual modules included in the processor according to an embodiment of the present invention.

Referring to FIGS. 4 and 6, the emotion extraction unit (310) performs a function for deriving the emotional state of the document author from the semantic context of the document written by a group member, and includes an AI-based emotion extraction module (410) and an emotion scoring module (415).

1. AI Emotion Extraction Module (410)

The artificial intelligence-based emotion extraction module (410) references an emotion list stored in the memory (210), which is configured as an emotion dictionary structure in which unique emotion classification scores are mapped to each emotion, as illustrated in FIG. 6.

The emotion list includes a plurality of emotions such as [happiness, joy, love, hope, surprise, neutral, irritation, anger, anxiety, depression].

Each emotion is numerically quantified with a score, for example, "happiness" is scored as +9, "sadness" as −6, "irritation" as −5, "hope" as +7, and "surprise" as 0, as shown in FIG. 6.

The emotion list may be structured according to a multidimensional classification system based on emotional axes such as extroverted/introverted and positive/negative.

During document analysis, an AI-based emotion analysis algorithm is executed on a sentence or paragraph basis within the document, and among the emotion list corresponding to the emotional state of the document author, a predetermined number (N) of emotions are selected and extracted as key emotions.

In this process, the AI-based emotion analysis algorithm may include pretrained natural language processing models such as BERT (Bidirectional Encoder Representations from Transformers), KoBERT (Korean BERT), ROBERTa, GPT, or fine-tuned models thereof. These models may be implemented as emotion classification neural networks that receive an embedding vector representing the contextual semantics of the document as input and output probabilities or scores corresponding to emotion labels.

2. Emotion Scoring Module (415)

The Emotion Scoring Module (415) assigns a numerical score to each of the key emotions extracted by the AI Emotion Extraction Module (410), based on the emotion scores defined in FIG. 6 (e.g., Happiness: +9, Anger: −7). Using these assigned values, the module calculates a composite emotion score representing the overall emotional state of the document author.

The emotion score may directly reflect the classification scores assigned to each emotion or may be computed using operations such as the following:

Arithmetic Mean of Key Emotion Scores

This refers to calculating the average of the predefined numerical scores assigned to each of the extracted key emotions. The arithmetic mean provides a simple representation of the overall emotional polarity of a document author.

EXAMPLE

If the system extracts the following three key emotions from a document:

Joy: +8

Love: +7

Irritation: −5 Then the composite emotion score is calculated as:

$$(+8)+(+7)+(-5)3=10/3 \approx +3.3$$

This arithmetic mean is then used to determine emotional alignment with other members, assess group sentiment distribution, and detect anomalies such as emotional deviation or risk.

Weighted Average

This method calculates a composite emotion score by assigning weights to each extracted emotion based on its confidence level, intensity, or frequency as determined by the emotion classification model.

Instead of treating all emotions equally (as in an arithmetic mean), the weighted average gives more influence to emotions that the model evaluates as more dominant or reliable.

Example

Assume the following extracted emotions and their corresponding weights (confidence scores or intensities):

Joy: Score=+8, Weight=0.6

Love: Score=+7, Weight=0.3

Irritation: Score=−5, Weight=0.1

The composite emotion score is calculated as:

$$((+8 \times 0.6)+(+7 \times 0.3)+(-5 \times 0.1))/(0.6+0.3+0.1)=6.4$$

This method enables more nuanced emotion scoring, particularly in documents where one emotion is strongly expressed compared to others. It is useful in fine-tuning sensitivity in group sentiment analysis and detecting subtle emotional shifts.

Negative Emotion Concentration Calculation

This method is used to evaluate the emotional risk level of a document's author by analyzing how much of their emotional expression is dominated by negative emotions.

Instead of calculating a simple average of all emotion scores, this approach focuses on identifying the proportion or intensity of negative emotions (e.g., anger, sadness, anxiety, fatigue) among all extracted emotions. This is particularly valuable for detecting psychological distress, early signs of emotional burnout, or social withdrawal.

Example 1: Proportional Method

Assume the extracted emotions and their predefined emotion classification scores (from an emotion dictionary):

Joy: +8

Anger: −6

Fatigue: −4

Out of 3 emotions, 2 are negative.

Negative Emotion Concentration=2/3=66.7%

Example 2: Weighted Intensity Method

Use emotion scores to quantify the strength of negative emotion:

Sum of negative emotion scores: (−6+−4)=−10

Sum of absolute values of all emotion scores: |+8|+|−6|+ |−4|=18

→Negative Intensity Ratio=10/18=55.6%

The composite emotion score derived in this manner is utilized to evaluate emotional similarity among group members and to detect potential isolation risks. This score is compared against a pre-defined emotional threshold stored in the reference threshold table, and serves as a baseline for subsequent analytical determinations.

By using an emotion score mapping table as illustrated in FIG. 6, qualitative emotion analysis results can be converted into quantitative numerical values, allowing the system to interpret emotional bias or tendencies even in mixed emotional states in a measurable format.

Accumulation of negative emotions, prolonged isolated emotional states, or rapid shifts in emotional scores may serve as indicators for detecting isolation or behavioral anomalies among members. These indicators are directly linked to the isolation assessment and supportive message output functions of the Member Relationship Analysis Unit (330).

For instance, if a downward trend in emotional scores is observed over the past three days—such as [−3.0, −5.2, −6.8]—the Centrality Change Monitoring Module (460) may activate and transmit a risk alert to the administrator terminal (120).

Accordingly, the Emotion Scoring Module (415) generates a structured emotional state index based on the extracted emotional information, thereby going beyond simple emotion tagging and providing critical input for higher-order relationship analyses such as time-series-based emotional tracking, isolation detection, and empathetic group matching.

The Emotion Scoring Module (415) first automatically classifies each of the one or more emotional elements output by the AI Emotion Extraction Module (410) into one of three emotional categories: positive, neutral, or negative.

This classification is performed based on a pre-stored emotion scoring table in the memory (210) (e.g., see FIG. 6), in which each emotion is preassigned a score within a range of integers (e.g., −9 to +10) according to its emotional polarity (e.g., extroverted positive, introverted negative, etc.).

For example, if the extracted emotions are "sadness," "joy," and "annoyance," the corresponding retrieved from the emotion scoring table may be −6, +8, and −5, respectively. The Emotion Scoring Module then calculates the composite emotion score of the document author either by directly summing or averaging these individual emotion scores, or by applying weights based on the extracted emotion probabilities.

The composite emotion score thus calculated serves as a quantified index representing the overall tendency and intensity of emotions. It is used as a key input in subsequent analysis stages such as inter-member emotional similarity analysis, emotion-sharing determination, and abnormal emotion detection.

This scoring methodology converts qualitative emotion classification results (labels) into quantitative values (scores), enabling emotional relationships among group members to be evaluated in a mathematically measurable and reliable manner. Furthermore, by tracking changes in document emotion scores over fixed time intervals (e.g., daily, weekly, monthly), this method can be linked to advanced features such as emotion trend monitoring and anomaly detection for each member.

The comparison reference table is a data structure stored in the memory (210), serving as a criterion storage means that contains various threshold values and criterion thresholds applied to the decision logic of the member relationship analysis unit (330).

More specifically, the comparison reference table includes the following types of threshold values:

1. Keyword Similarity Threshold:

When the quantitatively calculated similarity value between key keywords extracted from documents written by group members on the same date or over a specified period exceeds this threshold, the system determines that the corresponding members are sharing a common event or interest.

The similarity computation may be implemented using, for cosine similarity based on TF-IDF or vector example, similarity derived from BERT embeddings.

2. Emotion Score Threshold:

If the difference in composite emotion scores between group members for documents created on the same date or over a specific time period is equal to or less than this threshold, the system determines that the members are sharing similar emotional states.

The emotion scores are generated by the Emotion Scoring Module (415), which aggregates the quantitative scores assigned to each emotion.

3. Group Identification Threshold:

If a specific member exceeds this threshold number of days within a recent predefined time period during which both keyword similarity and emotion similarity criteria are simultaneously satisfied with other members, those members are determined to be emotionally connected.

In such cases, if the number of associated members is three or more, they are classified as a group; if only two members meet the criteria, they are classified as a pair.

4. Negative Emotion Threshold:

If the cumulative sum of negative emotion scores extracted from a member's documents over a predefined time period exceeds this threshold, the member may be classified as being in an emotionally at-risk state.

5. Anomaly Deviation Threshold:

A threshold value used to detect emotional anomalies by quantifying how much a member's daily composite emotion score deviates from their average or median score over time.

Example: If a member's daily composite emotion score deviates beyond ±2 standard deviations from their average score over a given period, the system classifies the state as anomalous.

6. Anomalous Emotion Frequency Threshold:

If the number of days on which a member's composite emotion score exceeds the Anomaly Deviation Threshold surpasses this threshold value, the system determines that the member is in a persistently emotionally unstable state.

7. Cumulative Negative Threshold:

If the total accumulated negative emotion scores over a defined period exceed this threshold, the system determines that the corresponding member is potentially isolated or in a persistently negative emotional state.

Used as a trigger for risk assessment or supportive message generation.

8. Emotion Similarity Threshold:

If the types of emotions extracted from documents on the same date match and the difference in their emotion scores is below this threshold, it is determined that the emotions are shared.

This threshold is also used by the Centrality Display Module (445) to determine the type of relationship line (positive/negative/neutral) between members.

9. Insider Threshold:

If a member's centrality score, calculated by the Individual Centrality Calculation Module (450), exceeds this threshold, the member is classified as an insider (a core member within the group).

10. Outsider Threshold:

If a member's centrality score falls below this threshold, the member is classified as an outsider (a socially isolated or disconnected member).

11. Risk Judgment Threshold:

If the proportion of relationship links connected through negative emotions exceeds this threshold, the member is identified as being in a risk group, and a warning may be issued to the administrator.

The comparison reference table is referenced in real-time by internal decision modules within the member relationship analysis unit (330), such as the emotion-sharing determination module (425), member relationship determination module (430), and anomaly detection module (435). It is utilized to enhance the quantitative consistency and reliability of judgment results.

This comparison reference table may be either statically predefined or designed to be dynamically updated during operation via AI-based learning algorithms. For example, if the emotional type distribution or keyword usage pattern of new members statistically deviates beyond a certain threshold, the corresponding values in the table may be automatically adjusted, enabling the system to operate as an adaptive threshold system.

Figure 5:
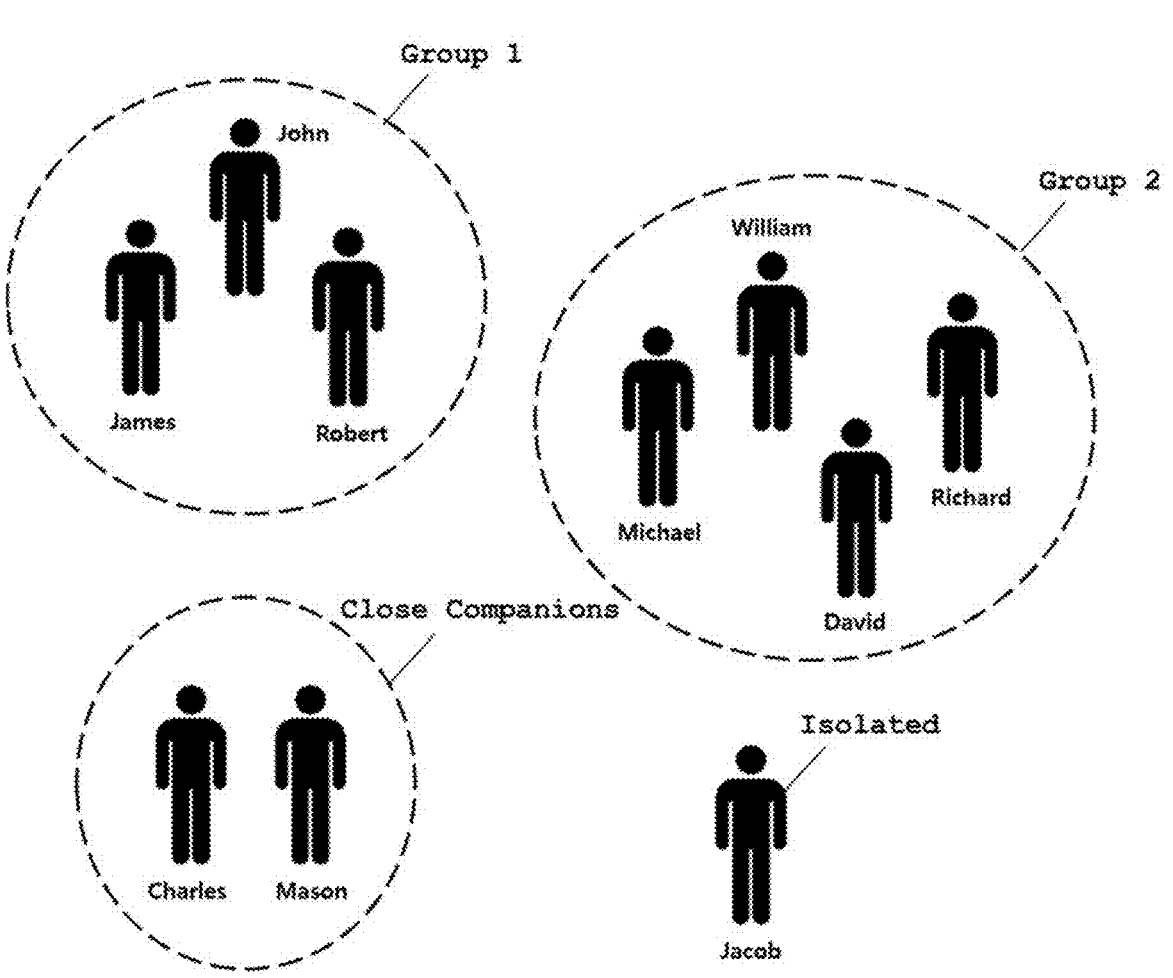
FIG. 5 is a diagram illustrating an example of visually representing connection relationships and isolation states among group members using key emotions and key keywords, according to an embodiment of the present invention.

Referring to FIG. 5, the member relationship analysis unit (330) calculates, for each pair of group members, the keyword similarity and the composite emotion score similarity on a per-date basis, based on the document data of each member stored in the document database (250) for a recent period (e.g., 7, 14, or 30 days).

More specifically:

Keyword similarity is computed using morpheme analysis-based TF-IDF methods or BERT embedding cosine similarity.

Emotion similarity is determined based on the difference between the composite emotion scores of each member for the same date.

If, for a given day, both of the following conditions are met between two members:

The keyword similarity is equal to or above the keyword similarity threshold stored in the comparison reference table, and The difference in composite emotion scores is equal to or below the emotion score threshold, then that date is considered a "related date" between the two members.

If the cumulative number of such associated dates exceeds the group identification threshold (e.g., five or more days) stored in the comparison reference table, the pair of members is determined to have a "group" or "close companions" relationship. Whether the relationship is determined as a group or as close companions may depend on the number of members included in the pair. For example, if three or more are involved, it is determined to be a "group," members whereas if only two members are involved, it is determined to be "close companions."

In addition, if a particular member does not form any associated dates with other members through the above determination process—that is, the member continually fails to meet the threshold for both keyword similarity and emotion similarity with any other member—and, at the same time, the average or cumulative of sum negative emotion scores calculated from documents generated by the member over a recent period exceeds the negative emotion threshold, the member is determined to be an "isolated member."

FIG. 5 illustrates an example in which Group 1, Group 2, close companions, and isolated members are identified and visually represented using the above-described method. In FIG. 5, Jacob is shown as an isolated member.

Such isolation determination may be linked to an anomalous emotion alert system or a support message generation module, such that an individual alert or behavioral recommendation message can be output to the administrator terminal (120) or the corresponding member terminal (110).

The member relationship analysis unit (330) includes a plurality of modules configured to independently determine whether events or emotions are shared among members, based on document data written on the same date by group members and stored in the document database (250). These determination results are collectively used to quantitatively infer the structure of social relationships, and the analysis unit is configured as follows:

1. Event-Sharing Determination Module (420)

Input Data: A set of key keywords extracted by the keyword extraction unit (320) from documents authored by multiple members on the same date.

Analysis Method:

For each member pair, the module calculates a similarity score between the respective keyword sets using natural language processing techniques such as TF-IDF, Word2Vec, or BERT-based embedding.

If the calculated similarity score exceeds the keyword similarity threshold stored in the comparison reference table, the module determines that the corresponding member pair has experienced or been involved in a common event.

For example, if keywords such as "exam," "assessment," and "results announcement" exhibit high similarity, the members are considered to have been exposed to or engaged in the same event.

2. Emotion-Sharing Determination Module (425)

Input Data: The primary emotions derived by the emotion extraction unit (310) and the composite emotion scores calculated by the emotion scoring module (415) from each member's document authored on the same date.

Analysis Method:

If at least one emotion type (e.g., "anxiety," "depression") is shared between members, and the difference in their corresponding composite emotion scores is equal to or less than the emotion score threshold stored in the comparison reference table, the two members are determined to be sharing the same emotional state.

This determination is not based on simple text matching, but rather on a quantitative analysis of emotional level differences, which are output by an emotion classification neural network such as one based on BERT, KoBERT, or ROBERTa.

3. Member Relationship Determination Module (430)

Based on the combined results from the event-sharing determination module (420) and the emotion-sharing determination module (425), the member relationship determination module assesses social connectivity as follows:

Group Determination:

If three or more members share both events and emotions on the same date, and the number of such occurrences exceeds a predefined threshold (group identification threshold) stored in the comparison reference table over a recent predetermined period, those members are determined to constitute a social group.

Pair Determination:

If two members share both events and emotions on the same date, and the number of such shared instances exceeds the same threshold, the pair is identified as close companions.

Isolation Determination:

If a particular member does not share any events or emotions with any other members during the recent predetermined period, and the average or cumulative value of negative emotion scores derived from that member's documents exceeds the negative emotion threshold stored in the comparison reference table, the member is classified as being socially isolated.

Such determination modules do not merely perform static analysis, but function as a real-time, quantitative social network analysis system by comprehensively considering cumulative relational information and emotional state variations over time. This enables integration with administrator user interfaces (UIs) or feedback systems to support various applications such as real-time monitoring, early intervention, and generation of personalized support messages.

The member relationship analysis unit (330) includes an anomaly detection module (435) configured to detect quantitatively abnormal emotional states in order to comprehensively analyze the social connectivity and emotional status among members. The anomaly detection module (435) operates in cooperation with the member relationship determination module (430), which determines the risk level by associating emotional anomalies with the assessment of social relationships.

1. Anomaly Detection Module (435)

Input: For each member, a time series of daily composite emotion scores over a predetermined period (e.g., the most recent 7 or 30 days).

These emotion scores are quantitative values generated per day, calculated by the emotion scoring module (415) based on weighted results of emotion classification.

Analysis Algorithm:

(1) Reference Value Calculation:

A reference value (e.g., an average or median) is computed from the member's time series of emotion scores.

(2) Deviation Analysis:

The absolute deviation between each day's emotion score and the reference value is calculated. If the deviation exceeds the anomaly deviation threshold (4), the corresponding day is considered to exhibit anomalous emotion.

(3) Anomaly Count Accumulation:

The number of days on which such anomalous emotion is detected is accumulated.

(4) Final Determination:

If the accumulated number of anomalous emotion days exceeds the anomalous emotion frequency threshold (N), the corresponding member is classified as an outlier.

In one embodiment, the anomaly detection module (435) may apply statistical outlier detection techniques based on either mean and standard deviation or median and interquartile range (IQR).

For example, when using mean and standard deviation, the module analyzes the composite emotion scores of each group member over the most recent 20 days on a per-day basis. For each day, the module calculates the mean and standard deviation of the composite emotion scores across all members. If the number of days on which a particular member's daily composite emotion score deviates from the daily group mean by more than ± one standard deviation exceeds 10 days (i.e., more than 50% of the 20-day window), the member is determined to be an outlier.

In another example, when using median and interquartile range (IQR), the module similarly analyzes the composite emotion scores of each group member over the most recent 20 days. For each day, the median and IQR of the group's composite emotion scores are calculated. A member's daily emotion score is considered an outlier for that day if it is less than the first quartile (Q1) minus 1.5 times the IQR or greater than the third quartile (Q3) plus 1.5 times the IQR. If such outlier conditions occur on more than 10 days (i.e., more than 50% of the 20-day period), the member is classified as an outlier.

2. Interlocking with the Risk Evaluation Logic of the Member Relationship Determination Module (430)

Input Conditions:

A member is determined to be an at-risk member when all of the following conditions are met:

The member does not belong to any group or pair network as determined by the relationship analysis logic;

The member's cumulative or average negative emotion score, calculated over a recent fixed time window by the emotion scoring module (415), exceeds the predefined Cumulative Negative Threshold stored in the comparison reference table;

The member is classified as being in an anomalous emotional state by the anomaly detection module (435).

Outcome Determination:

If the above three conditions are satisfied, the corresponding member is identified as an at-risk member. This status is then used by other components—such as the support message output module (440) and the individual centrality computation module (450)—to generate alerts, intervention triggers, or emotional care messages, which may be transmitted to administrators or system users for proactive engagement.

The member relationship analysis unit (330) further comprises a support message output module (440) configured to provide personalized emotional support based on each member's individual emotional state and the results of social relationship analysis within the group.

1. Input Data-Based: Integrated Analysis of Member Relationships and Emotional Information Input Sources:

The social relationship status of each member as determined by the member relationship determination module (430), such as:

Group affiliation, paired relationship, or isolation;

The underlying emotional and keyword information used for determining such relationships, including:

Key keywords extracted from documents by the keyword extraction unit (320); and Primary emotions and emotion scores analyzed by the AI emotion extraction module (410) and the emotion scoring module (415).

Processing Procedure:

(1) For each member, the support message output module retrieves the stored daily records of keywords and emotional data from memory (210).

(2) It utilizes an artificial intelligence algorithm (e.g., Transformer-based sentence generation algorithm or emotion-similarity-based response generation algorithm) to analyze the member-specific data.

(3) Based on the analysis, the module automatically generates a context-aware personalized message suitable for the emotional and relational state of the member.

2. Support Message Generation Algorithm

The support message output module (440) generates personalized support messages by applying a sentence generation algorithm based on the emotional and relational state of the member. The algorithm operates according to predefined classifications of social-emotional status and employs dynamic message construction techniques, as described below:

(a) Message Construction According to Member State Classification:

Isolated Member:

When a member is identified as being in an isolated state, with a lack of connected relationships and a negatively skewed emotion score, the system generates an empathetic and comforting message reflecting the member's emotional keywords and state.

Example

"It seems like your mind has been heavy lately. But please remember, you're not alone."

Group-Affiliated Member:

When the member belongs to a group, sharing events and emotions with multiple other members, and exhibits a positive emotional state, the system generates a message that reinforces a sense of belonging and encourages continued engagement.

Example

"Your thoughts are having a positive impact on your team. Let's keep moving forward together!"

At-Risk Member:

If a member is concurrently identified as isolated, emotionally anomalous, and exhibiting cumulative negative sentiment, the system carefully generates a warm and encouraging message acknowledging their emotional complexity.

Example

"Every emotion you feel is valid. We are listening to your inner voice."

(b) Technical Configuration of Sentence Generation:

The message generation algorithm is implemented using a hybrid approach that combines:

A pre-trained sentence generation template, and

A dynamic insertion structure that adapts to real-time emotional and keyword inputs.

Example Template Structure:

"Because of [KEYWORD], you've been feeling [EMOTION] lately, haven't you? It's okay. [Support Message Template]"

This architecture enables the system to produce messages that are semantically appropriate and emotionally aligned with each member's current psychological and social context.

3. Output Mechanism (a) Output Format:

The support message output may be provided in various formats, including:

Visual display through a graphical user interface (GUI),

Report delivery to administrators, teachers, or counselors, or

Direct transmission to the individual member (e.g., via mobile message or email).

(b) Utilization Effects:

By automating emotional intervention rather than merely performing emotional and relational analysis, the system facilitates proactive responses from administrators or support personnel. The generated support messages contribute to emotional stability and enhance a sense of belonging among members.

The support message output module (440), based on the relational analysis and emotion-based results derived from the member relationship determination module (430) and emotion score module (415), employs a natural language generation algorithm to produce individualized emotional support messages embedded with empathetic language. This architecture implements a technical advancement by extending beyond basic analysis to include psychological intervention capabilities.

So far, the system has determined that, if two or more group members share semantically similar keywords (i.e., event sharing) and at least one emotion type in common, with their respective composite emotion scores being within a predefined threshold (i.e., emotion sharing), then such members are classified as a group or close companions. Conversely, if a member does not belong to any group or pair and exhibits a cumulative negative emotion score exceeding a predefined threshold over a recent time period, the member is identified as being in an isolated state.

The following section describes centrality analysis. Centrality analysis is a methodology derived from Social Network Analysis (SNA) and is used to evaluate how central or influential a specific member is within the social network. Through centrality metrics, the system is capable of capturing deeper relational insights among group members and enables multidimensional interpretations of social structures such as isolation, close companionship, and group clustering.

Figure 7:
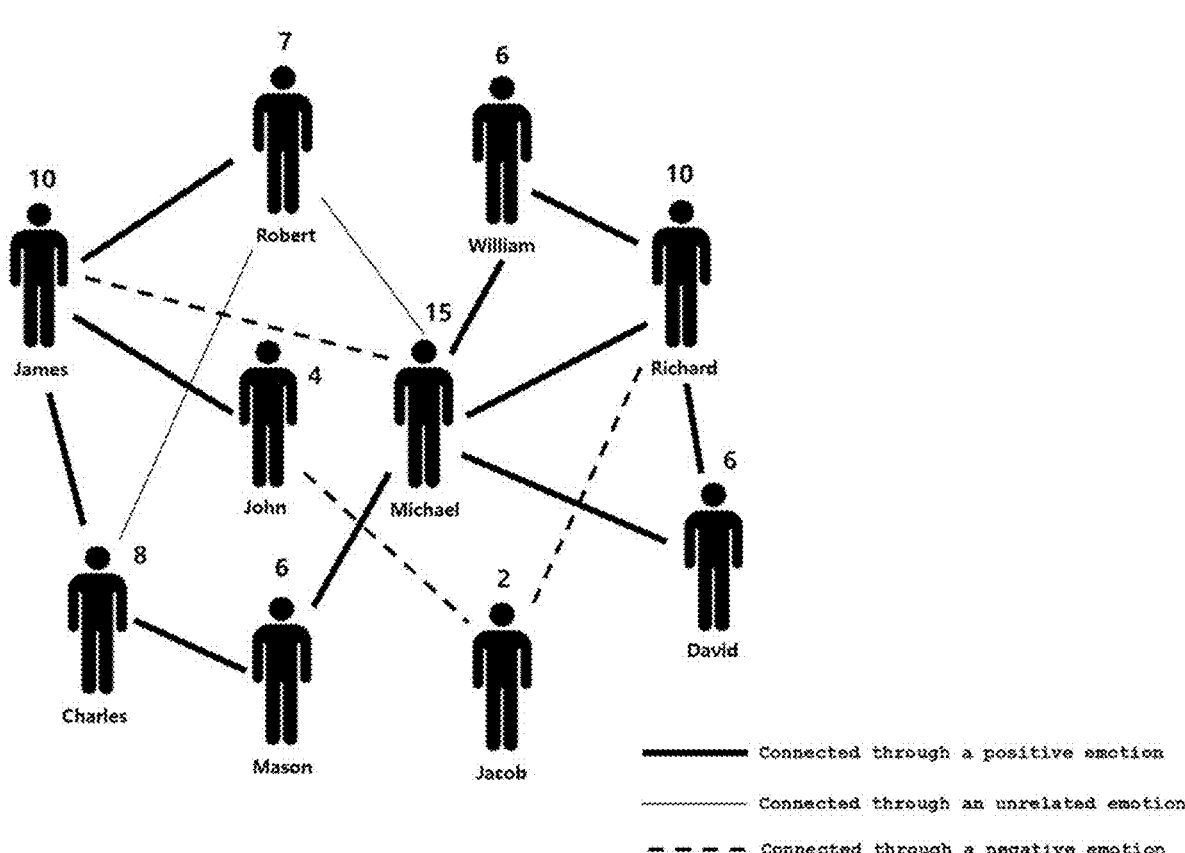
FIG. 7 is a diagram illustrating an example of centrality visualization showing connection relationships and emotional states between group members as connection lines, according to an embodiment of the present invention.

Based on FIG. 7, the member relationship analysis unit (330) includes a centrality display module (445) that analyzes and visually represents the structural relationships among group members based on multiple documents authored on the same date. The centrality display module (445) constructs a multidimensional representation of the interpersonal network by integrating event-sharing relationships based on keyword similarity and emotional connectivity based on shared emotional states.

The centrality display module (445) operates through the following steps:

1. Generation of Relationship Edges Based on Keyword Similarity:

First, the keyword extractor (320) calculates the similarity between keywords extracted from each member's documents. This similarity may be computed using methods such as cosine similarity, Jaccard similarity, or embedding-based distance measures.

Subsequently, if the keyword similarity between the documents of two specific members exceeds the keyword similarity threshold stored in the comparison reference table in memory, the centrality display module (445) forms a relationship edge (edge) between those members.

This edge represents shared events, topics, or interests, and is generated independently of the members' emotional states.

2. Emotional Attribute Annotation of Relationship Edges:

To further analyze the characteristics of relationship edges formed as described above, the emotion extractor (310) identifies the emotion types from the same-day documents authored by the corresponding members, and the emotion scoring module (415) calculates a composite emotion score for each document.

If at least one emotion type matches between the documents of Member A and Member B, and the difference in their composite emotion scores is within the emotion similarity threshold defined in the comparison reference table, the centrality display module (445) classifies the edge as an emotion-sharing relationship.

If the shared emotion is positive, the edge is marked as a positive connection.

If the shared emotion is negative, the edge is marked as a negative connection.

Conversely, if no emotion types match and the emotion score difference exceeds the threshold, the edge is considered emotionally neutral or irrelevant and is marked as a neutral connection.

3. Visual Representation and Semantic Differentiation of Relationship Edges:

The centrality display module (445) visually differentiates the three types of relationship edges-positive, negative, and neutral-based on emotional connection types, allowing for an intuitive understanding of which events are shared and what emotional similarities exist between members in the network.

For example:

A thick solid line may represent a positive emotional connection,

A dotted line may indicate a negative emotional connection, and

A thin solid line may represent an emotionally neutral connection.

Through this configuration, the member relationship analysis unit (330) structures the correlation between event-based information flow and emotion-based social connectedness, enabling more refined detection of relationship patterns among group members beyond mere keyword or emotion similarity.

FIG. 7 illustrates an example of centrality analysis for a single day:

Thick lines represent members connected through positive emotions,

Thin lines denote emotionally unrelated connections, and

Dotted lines indicate negative emotional connections.

In the illustrated example:

Each type of connection is weighted: thick line (positive)=3 points, thin line (neutral)=2 points, dotted line (negative)=1 point.

Each student's centrality score is calculated by summing the edge values.

Michael has the highest score of 15, indicating high centrality, while Jacob has the lowest score of 2, indicating low centrality.

This centrality graph represents a single day's network and allows for multiple connections per person. It provides a different analytical perspective from FIG. 5, which focuses on group, pair, and isolation relationships.

While FIG. 5 only shows that Jacob is isolated, FIG. 7 reveals with whom Jacob is negatively connected.

Together, FIGS. 5 and 7 offer complementary insights, enabling teachers or workplace supervisors to identify and support isolated members through targeted psychological guidance or interventions.

The centrality display module (445) is configured to perform repeated keyword and emotion similarity analyses among group members for each document created on each day within a recent predefined period, and to update or add relationship edges cumulatively based on the results.

More specifically, the centrality display module (445) performs the following functions:

1. Cumulative Visualization of Relationship Edges Based on Daily Document Analysis:

The member relationship analysis unit (330) sequentially analyzes daily document data collected over a preset period—for example, 7, 14, or 30 days.

For each day, it independently performs keyword similarity and emotion similarity analyses between members. Based on the analysis results, one or more new relationship edges are generated from the documents created on that specific day.

In this process, even between the same pair of members, similarity is assessed independently for each day's documents. As a result, multiple overlapping relationship edges of different types may be created between the same pair of members, depending on the content and context of their respective documents for different days.

2. Multi-Representation of Relationship Edges and Time-Series Integration:

The centrality display module (445) visualizes relationship edges between the same pair of members by overlaying them or displaying them as branches or layers along a time axis, thereby representing the frequency and persistence of the relationships.

For example, if Member A and Member B exceeded the keyword similarity threshold on 5 out of the past 7 days, indicating shared events, the relationship edge may be:

Overlaid as five parallel lines,

Or visualized as a single thicker edge, proportional to the number of matches,

And further annotated or color-coded to reflect the emotion similarity (e.g., positive, negative, or neutral).

This visualization supports intuitive understanding of both the strength and emotional nature of the connection over time.

3. Support for Time-Series-Based Relationship Pattern Analysis:

The centrality display module (445) enables the analysis of changes and continuity in relationships between members over time by utilizing the accumulated multi-edge relationship data.

Specifically, if the relationship edges weaken progressively during a set period (e.g., fewer shared events or reduced frequency), or if there is a sudden shift in emotional similarity (e.g., from positive to negative or to emotionally neutral), the module can prompt alerts regarding a potential emotional distancing or weakening of social bonds between the members.

This time-series analysis functionality enhances the system's ability to detect early signs of social disconnection or emotional instability in relationships.

4. Integration with Centrality Calculation:

The centrality display module (445) accumulates relationship edges based on document-level analyses, thereby supporting the individual centrality calculation module (450) in more accurately computing each member's degree of connectedness.

By compiling relational data over multiple time points, this method enables a multi-dimensional network analysis that goes beyond single-point snapshots. This temporal integration allows administrators (e.g., teachers or team leaders) to detect early signs of social disconnection or patterns of marginalization, contributing to proactive monitoring and support for group members.

The member relationship analysis unit (330) additionally includes an individual centrality calculation module (450) to quantitatively assess the connection structure between the document author and other group members.

The individual centrality calculation module (450) functions to compute each member's centrality score-a quantified metric representing the degree of social centrality or relational prominence within the group-based on both the number and type of relational edges connected to that member. This centrality value reflects not only the density of interactions but also incorporates the qualitative nature of emotional connections (e.g., positive, negative).

Configuration and Operational Example

1. Collection and Scoring of Relationship Edges:

The individual centrality calculation module (450) collects relationship edge data generated by the centrality display module (445), which is based on keyword similarity and emotional similarity between members.

In FIG. 7, each type of edge is assigned a different weight or score depending on the nature of the emotional connection:

Thick solid line (positive emotional connection): High score (e.g., 3 points)

Thin solid line (neutral/irrelevant emotion): Medium score (e.g., 2 points)

Dotted line (negative emotional connection): Low score (e.g., 1 point)

2. Analysis of Individual Connection Structures:

For each member, the total number of edges generated during a given period is calculated. Then a comprehensive score is computed by considering:

The number of unique members they are connected to (connection breadth),

The frequency of each emotional type involved in the connections.

If a member is connected through multiple emotional types, the centrality score may be adjusted using a weighted average that reflects the distribution of those emotional types.

3. Centrality Score Calculation and Storage:

The final score calculated for each member is defined as their centrality value. This centrality value is stored and may be used by the centrality change monitoring module (460) for longitudinal analysis and trend prediction.

For example, FIG. 7 illustrates a single day's centrality analysis results, but the system can accumulate and track daily centrality scores over time.

On the day shown in FIG. 7, Michael recorded the highest centrality score of 15, while Jacob had the lowest score of 2.

The member relationship analysis unit (330) further includes a lifestyle classification module (455) to categorize the social relationship patterns of group members, enabling administrators to immediately understand each member's relational status within the group.

This lifestyle classification module (455) receives the following as input:

The centrality score quantitatively evaluated for each member's social prominence within the group, and The type distribution of emotional connection edges, reflecting the nature of each member's emotional interactions.

Based on these inputs, the module automatically determines each member's lifestyle type as one of the following:

Insider: A core member of the group who exhibits a high centrality score and maintains frequent positive emotional connections.

Outsider: A relatively isolated member with a low centrality score and a small number of emotional connections, often neutral or negative in tone.

High-risk member: A member showing low centrality and a high proportion of negative or unstable emotional interactions, which may indicate emotional distress or social withdrawal.

1. Insider/Outsider Determination:

Based on the centrality scores of individual members, as provided by the individual centrality calculation module (450):

If a member's centrality score is equal to or greater than the Insider Threshold stored in the comparison reference table, the member is classified as an insider.

If the centrality score is equal to or less than the Outsider Threshold stored in the comparison reference table, the member is classified as an outsider.

Because the score structural centrality reflects importance-derived from the number of relationship edges, the types of emotional connections, and the centrality of the connected members-insiders typically engage frequently with many members, often sharing positive emotions, whereas outsiders show the opposite pattern.

2. High-Risk Member Determination:

Using emotional connection edge data obtained through the centrality display module (445), the system calculates the proportion of a member's total connections that are based on negative emotions.

If this negative emotional connection ratio exceeds the Risk Judgment Threshold specified in the comparison reference table, the member is classified as a high-risk member.

Example: If 4 out of 6 total connection edges reflect negative emotional sharing, the ratio is 66.7%.

For example, if a member's centrality score is 10 points or higher on a given day, the member can be classified as an insider, and if the score is 5 points or lower, the member can be classified as an outsider.

If a member has two or more emotional connection lines associated with negative emotions, the member may be classified as a high-risk member.

In FIG. 7, James and Richard each have a score of 10 points, and Michael has 15 points, all of which qualify them as insiders. John, with 4 points, and Jacob, with 2 points, may be classified as outsiders. Furthermore, since Jacob has two or more connections involving negative emotions, he may also be classified as a high-risk member.

A high number of negatively connected relationship lines often indicates that the member may be experiencing social exclusion or bullying.

Such high-risk members are likely to be in a state of emotional isolation or located at the center of interpersonal conflict, making them key targets for early intervention.

Ultimately, this framework allows for multifaceted diagnosis of each member's social position and emotional well-being, extending beyond basic keyword similarity or sentiment analysis.

Particularly, the detection of high-risk members offers a proactive foundation for identifying and addressing emotional crises, conflict, or exclusion within the group.

The Member Relationship Analysis Unit (330) further includes a Centrality Change Monitoring Module (460) configured to monitor, in real time along a temporal axis, changes in the social position or emotional isolation tendencies of each group member. This module enables early identification of points at which administrative intervention may be necessary.

The Centrality Change Monitoring Module (460) collects and accumulates daily centrality scores calculated for each member and analyzes the trend of these scores over time. Based on this analysis, it is configured to detect gradual isolation or exclusion states in advance.

1. Daily Centrality Tracking:

The system collects the daily centrality score (Centrality Score) calculated for each member by the Individual Centrality Calculation Module (450), and stores the data in memory.

A time-series dataset representing changes in each member's centrality over a recent period (e.g., 7, 14, or 30 days) is constructed.

2. Trend Analysis:

Based on a predefined tracking period (e.g., 7 days) stored in the comparison reference table, the system determines whether a member's centrality score has shown a consistent downward trend.

For example, sequences such as 5-4-3-2-1, or a downward trend determined through regression analysis, are classified as exhibiting decline.

If the number of consecutive declines or the average rate of decline exceeds a defined threshold, the member is identified as being in a "sustained decline state."

3. Risk Assessment and Alert Notification:

When a sustained decline state is detected, the system judges that the member may be gradually disconnecting from the social network or experiencing increasing social isolation.

Accordingly, a personal alert may be transmitted to the relevant member, and an attention notification (Alert Notification) is sent to the corresponding administrator or supervisor.

Such notifications may be delivered via visual indicators on the system UI, email, or mobile push messages.

The centrality score of each member may be calculated daily and cumulatively tracked. By observing the accumulated centrality scores over a recent period (e.g., one month), it is possible to identify the trend of each member's social standing.

If a member's centrality score remains above a certain threshold or shows an increasing trend, it indicates that the member is highly connected or socially popular.

Conversely, if a member's centrality score exhibits a consistent downward trend or remains below a predefined threshold during the observed period, the system determines that the member is in a socially isolated or potentially high-risk state, and issues a notification to both the member and the administrator.

Ultimately, by quantitatively and temporally analyzing the emotional connections and social network dynamics among members, the system performs dynamic risk detection beyond simple static state analysis.

This enables administrators or counselors to recognize early signs of psychological withdrawal or bullying and prompts appropriate intervention.

The present invention enables objective and intuitive identification of social relationships within a group by analyzing documents authored by group members through artificial intelligence. By determining whether members share similar keywords and emotions, the system can assess whether they are socially connected as a group or close companions, or whether they are in an isolated state.

Rather than relying on intentional psychological assessments, the invention employs a method of analyzing everyday written records, thereby allowing more realistic and natural insights into each member's emotional and social context.

In addition, different types of relationship lines are visually rendered based on the emotional similarity between connected members. The centrality score for each member is cumulatively calculated and displayed, allowing administrators or counselors to instantly recognize who is socially central (popular) and who is becoming isolated, thereby enabling prompt and effective interventions.

While the invention has been described in detail with reference to preferred embodiments, those skilled in the art will appreciate that various modifications and alterations can be made without departing from the spirit or essential characteristics of the invention.

Thus, the described embodiments should be considered illustrative and not restrictive in any way.

The scope of the present invention should be defined by the appended claims, and all modifications and equivalents that fall within the meaning and scope of the claims should be construed as being included within the scope of the invention.

DESCRIPTION OF REFERENCE NUMERALS

110, 120, 130: Group member terminal, Administrator terminal
140: Network
150: Document analysis system
210: Memory
220: Processor
230: Communication interface
240: Input/output interface
250: Document database
310: Emotion extraction unit
320: Keyword extraction unit
330: Member relationship analysis unit
410: AI emotion extraction module
415: Emotion scoring module
420: Event-sharing determination module
425: Emotion-sharing determination module
430: Member relationship determination module
435: Anomaly detection module
440: Support message output module
445: Centrality display module
450: Individual centrality calculation module
455: Lifestyle classification module
460: Centrality change monitoring module

What is claimed is:

1. A document analysis system for analyzing documents using artificial intelligence to determine an emotional state and keywords of a document writer and identify relationships among group members, the system comprising:

a communication interface;

a memory storing an emotion list and a comparison reference table including a keyword similarity threshold, an emotion score threshold, an emotion similarity threshold, and a predefined tracking period; and at least one processor configured to execute computer-readable instructions stored in the memory, wherein the at least one processor is configured to:

(a) receive document data from member terminals via the communication interface, the document data including a context of daily documents commonly written by group members who regularly interact as a group in everyday life;

(b) analyze the context of each document by loading and executing an AI-based emotion analysis algorithm stored in the memory, extract a preset number of a plurality of primary emotions of the document writer from among a plurality of emotions listed in the emotion list stored in the memory, calculate an emotion score for each extracted emotion, and compute an overall emotion score of the document writer by performing an aggregate operation on the emotion scores;

(c) analyze the context of each document and extract a preset number of primary keywords from the context of the document by performing morpheme analysis, wherein the at least one processor is configured to process a semantic context of the document using a morpheme analyzer to decompose a text into morphemes, extract meaningful morphemes, remove stopwords, and apply TF-IDF or TextRank to automatically select the preset number of primary keywords;

(d) calculate the similarity between a plurality of keywords extracted from documents authored by group members on the same date, and, if the calculated similarity exceeds the keyword similarity threshold stored in the comparison reference table, connect the corresponding group members with a relationship line;

(e) for the group members connected by the relationship line on the same date, determine that the connected group members share emotions when at least one type of emotion extracted from the documents of the connected group members on the same date matches and a difference between their overall emotion scores is equal to or less than the emotion score threshold stored in the comparison reference table;

(f) for each relationship line between group members connected on the same date, when the connected group members have been determined to share emotions in step (e) and the difference between their overall emotion scores is equal to or less than the emotion similarity threshold stored in the comparison reference table, display the relationship line as being emotionally connected, either positively or negatively according to a type of the shared emotion, and, when the connected group members are not determined to share emotions in step (e) or the difference between their overall emotion scores exceeds the emotion similarity threshold, display the relationship line as indicating an emotionally unrelated connection;

(g) for each document generated on each date within the predefined tracking period, additionally display the relationship line between group members based on the keyword similarity analysis of step (d) and the emotion sharing determination of step (e) for that specific date, so that multiple relationship lines can be displayed between the same group members;

(h) calculate a centrality score for each group member by aggregating the number and types of relationship lines connected to each member;

(i) collect and accumulate daily centrality scores calculated for each member and store the data in the memory;

(j) construct a time-series dataset representing changes in each member's centrality over the predefined tracking period;

(k) track each member's centrality score on a daily basis and analyze trends over time; and (l) if, during the predefined tracking period stored in the comparison reference table, the centrality score is determined to continuously decrease, determine that the member is gradually becoming isolated, and if the member is determined to be isolated, output an individual alert or a behavioral recommendation message to an administrator terminal or a corresponding member terminal.

2. The document analysis system according to claim 1, wherein the at least one processor is further configured to:

classify each emotion into one of positive, neutral, or negative categories;

refer to an emotion classification score table stored in the memory to assign a score corresponding to the category of each emotion; and calculate an overall emotion score of the document writer by summing the assigned scores, whereby the system analyzes a document using artificial intelligence to identify the emotional state and keywords of the document writer and to determine relational characteristics among group members.

3. The document analysis system according to claim 1, wherein the comparison reference table is stored in the memory and includes a keyword similarity threshold, an emotion score threshold, a group identification threshold, a negative emotion threshold, an anomaly deviation threshold, an anomalous emotion frequency threshold, a cumulative negative threshold, an emotion similarity threshold, an insider threshold, an outsider threshold, and a risk judgment threshold, which are used as reference criteria to determine relationships among group members.

4. The document analysis system according to claim 1, wherein the at least one processor is further configured to determine that specific members are associated as a group or as close companions when the number of days during which the members satisfy both a keyword similarity condition and an emotion similarity condition exceeds a group identification threshold stored in the comparison reference table, and determines that a member is isolated when the member is not associated with any other member and the member's negative emotion score over a recent predetermined period exceeds the negative emotion threshold stored in the comparison reference table.

5. The document analysis system according to claim 1, wherein the at least one processor is further configured to:

calculate similarities among a plurality of keywords from documents written by group members on the same date, and to determine that the members share an event when the calculated similarity exceeds a keyword similarity threshold stored in the comparison reference table;

determine that the members share emotions when at least one type of emotion extracted from the documents of the group members on the same date matches, and the difference between comprehensive emotion scores calculated for the documents on the same date is less than or equal to an emotion score threshold stored in the comparison reference table; and determine that a group of three or more members belong to the same group when the number of cases in which both events and emotions are shared among them over a recent period exceeds a group identification threshold stored in the comparison reference table, to determine that two members are close companions when the number of cases in which they share both events and emotions exceeds the group identification threshold, and to determine that a member is isolated when the member is not part of any group or close companionship and the member's negative emotion score over a recent period exceeds the negative emotion threshold stored in the comparison reference table.

6. The document analysis system according to claim 5, wherein the at least one processor is further configured to:

analyze daily comprehensive emotion scores of group members over a recent period, and determine that a member exhibits an anomaly when the number of days on which the emotion score deviates from the average or median by more than an anomaly deviation threshold stored in the comparison reference table exceeds an anomalous emotion frequency threshold stored in the comparison reference table;

and determine that a member is a high-risk member when the member is not part of any group or close companionship, the member's negative emotion score over a recent period exceeds a cumulative negative threshold stored in the comparison reference table, and the member is determined to exhibit anomalies.

7. The document analysis system according to claim 5, wherein the at least one processor is further configured to:

based on a connection status or isolation determination of each group member, retrieve from memory the keyword and emotion information that served as the basis for such determination, analyze the retrieved information using an artificial intelligence algorithm, and generate and output individualized support messages reflecting each member's connection status or isolation and corresponding keywords and emotions.

8. The document analysis system according to claim 1, wherein the at least one processor is further configured to, determine a member as an insider if the member's centrality score is equal to or greater than an insider threshold stored in the comparison reference table, determine a member as an outsider if the centrality score is equal to or lower than an outsider threshold, and determine a member as a high-risk member if the ratio of relationship lines connected by negative emotions exceeds a risk judgment threshold stored in the comparison reference table.

* * * * *